United States Patent
Liao

(10) Patent No.: US 8,974,266 B2
(45) Date of Patent: Mar. 10, 2015

(54) NOVELTY SYSTEM UTILIZING TRANSLUCENT PUTTY AND AN INTERNAL ILLUMINATION MODULE

(71) Applicant: Chu-Yuan Liao, Taipei (TW)

(72) Inventor: Chu-Yuan Liao, Taipei (TW)

(*) Notice: Subject to any disclaimer, the term of this patent is extended or adjusted under 35 U.S.C. 154(b) by 169 days.

(21) Appl. No.: 13/672,682

(22) Filed: Nov. 8, 2012

(65) Prior Publication Data
US 2014/0127967 A1 May 8, 2014

(51) Int. Cl.
A63H 33/00 (2006.01)
A63H 33/26 (2006.01)
G02B 5/02 (2006.01)
A63H 33/22 (2006.01)

(52) U.S. Cl.
CPC .............. *A63H 33/26* (2013.01); *G02B 5/0236* (2013.01); *A63H 33/22* (2013.01)
USPC ............ 446/486; 446/485; 446/175; 524/588

(58) Field of Classification Search
USPC .......................... 252/582; 446/485, 486, 175
See application file for complete search history.

(56) References Cited

U.S. PATENT DOCUMENTS

| | | | | |
|---|---|---|---|---|
| 2,431,878 A | * | 12/1947 | McGregor et al. | 528/13 |
| 2,442,059 A | * | 5/1948 | Safford | 525/105 |
| 2,541,851 A | * | 2/1951 | Wright | 524/701 |
| 2,709,161 A | * | 5/1955 | Kilbourne, Jr. et al. | 524/588 |
| 3,050,491 A | * | 8/1962 | Nitzsche et al. | 524/588 |
| 3,070,559 A | * | 12/1962 | Nitzsche et al. | 523/211 |
| 3,634,280 A | * | 1/1972 | Dean et al. | 252/301.36 |
| 3,661,790 A | * | 5/1972 | Dean et al. | 252/301.36 |
| 3,696,090 A | * | 10/1972 | Lampe | 523/121 |
| 3,862,919 A | * | 1/1975 | Nitzsche et al. | 528/18 |
| 4,371,493 A | * | 2/1983 | Minuto | 264/236 |
| 4,942,211 A | * | 7/1990 | Sommer et al. | 528/14 |
| 4,968,760 A | * | 11/1990 | Schiller et al. | 525/477 |
| 5,319,021 A | * | 6/1994 | Christy | 524/857 |
| 5,388,825 A | * | 2/1995 | Myers et al. | 473/570 |
| 5,446,075 A | * | 8/1995 | Gibbon | 523/137 |
| 5,472,994 A | * | 12/1995 | Micallef et al. | 523/137 |
| 5,607,993 A | * | 3/1997 | Christy | 524/237 |
| 5,693,689 A | * | 12/1997 | Gibbon | 523/137 |
| 6,142,894 A | * | 11/2000 | Lee | 473/570 |
| 6,391,941 B1 | * | 5/2002 | Williams | 523/122 |
| 6,428,432 B1 | * | 8/2002 | Kachel | 473/570 |
| 6,464,602 B1 | * | 10/2002 | Rottger | 473/571 |
| 7,165,869 B2 | | 1/2007 | Chernick et al. | |
| 7,618,349 B1 | * | 11/2009 | Muderick | 482/44 |
| 7,862,894 B2 | * | 1/2011 | Modell et al. | 428/403 |
| 2005/0231961 A1 | * | 10/2005 | Mahoney | 362/363 |

OTHER PUBLICATIONS

PubChem, Stearic Acid, uploaded Jun. 18, 2014, PubChem, 1 page.*

* cited by examiner

*Primary Examiner* — Gene Kim
*Assistant Examiner* — Matthew B Stanczak
(74) *Attorney, Agent, or Firm* — LaMorte & Associates, P.C.

(57) ABSTRACT

A novelty system having an internally illuminated amorphous putty that both stretches and bounces. An illumination module is provided that contains a battery and at least one light source that produces light when powered. A volume of putty material is provided in an amount sufficient enough to completely envelop the illumination module. The putty material is translucent so that the light from the light source can be seen through the putty material when the illumination module is enveloped within the putty material. The translucent putty material is created by reacting silicon polymers with boric acid and stearic acid. The reacted polymers are mixed with calcium carbonate, a whitener, and a colorant to obtain a color tinted level of translucency. The illumination module is activated by changes in acceleration caused by impact.

17 Claims, 3 Drawing Sheets

NOVELTY SYSTEM UTILIZING TRANSLUCENT PUTTY AND AN INTERNAL ILLUMINATION MODULE

BACKGROUND OF THE INVENTION

1. Field of the Invention

In general, the present invention relates to the composition of novelty elastomeric materials such as novelty amorphous putties. The present invention also relates to novelty objects that are internally illuminated.

2. Prior Art Description

Amorphous putties made from the reaction of boric acid and silicon oil have been in existence since the invention of Silly Putty® in 1948. See U.S. Pat. No. 2,541,851 to Wright, entitled Process For Making Puttylike Elastic Plastic Siloxane Derivative Compositions Containing Zinc Hydroxide. Since that time, numerous formulations of amorphous putties have been formulated in order to enhance or diminish certain innate characteristics of the original formulation.

Putties made of boric acid and silicon oil are produced by creating a silicone polymer, via the hydrolysis of dichlorodimethylsilane. This silicone polymer, which contains residual hydroxyl groups, can be cross-linked using boric acid ($B(OH)_3$). The boric acid is a trifunctional acid that forms —Si—O—B-linkages. This produces a peculiar type of putty or gum that can easily stretch when slowly pulled. However, the putty can resiliently resist any sudden deformation formations. As a result, the putty will bounce, rather than deform, when dropped against a hard surface.

Another characteristic of prior art boric acid/silicon oil putties are that the putties are uniformly opaque. Although the putties can be dyed different colors, no boric acid/silicon oil putty formulations have been created in the prior art that are either transparent or translucent.

There are many toy novelties that contain internal lights. For example, there are internally illuminated golf balls, footballs, and soccer balls that are commercially available. Many of these novelty products use internal illumination modules. The illumination modules contain the light source and batteries needed to power the light source. Internal illumination modules have even been inserted into novelty items molded from elastomeric co-block polymers. Such prior art is exemplified by U.S. Pat. No. 7,165,869, to Chernick, entitled Internally Illuminated Elastomeric Novelty Device With External Projections. However, in the prior art, molded elastomeric polymers are not amorphous. Although such elastomeric polymers can be stretched, those elastomeric polymers are molded into a specific shape and return to that specific shape after being stretched. Conversely, amorphous putties are not molded and are incapable or retaining any one shape. Since amorphous putties cannot be molded into a shape, amorphous putties cannot be molded into shapes that have internal pockets for holding an illumination module. Due to the amorphous nature of the putty, features such as on/off switches would become inaccessible as the putty reshapes around an illumination module.

The present invention system utilizes a novelty putty that is translucent and comes with a specially adapted illumination module that can operate while encased within an amorphous putty. The novel details of the invention are described and claimed below.

SUMMARY OF THE INVENTION

The present invention is a novelty system for an internally illuminated amorphous putty that both stretches and bounces. An illumination module is provided that contains a battery and at least one light source that produces light when powered by the battery. A volume of putty material is provided in an amount sufficient enough to completely envelope the illumination module. The putty material is translucent so that the light from the light source can be seen through the putty material when the illumination module is enveloped within the putty material.

The translucent putty material is created by reacting silicon polymers with boric acid and stearic acid. The reacted polymers are mixed with calcium carbonate, a whitener, and a colorant to obtain a color tinted level of translucency. The level of translucency is great enough to enable the lights from the illumination module to be viewed through the putty material when the illumination module is fully encased in the putty material.

The illumination module is activated by changes in acceleration caused by impact. Consequently, when the illumination module is encased in the putty material and the assembly is bounced, the illumination module will activate. The illumination module will remain activated for a predetermined period of time before automatically deactivating.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
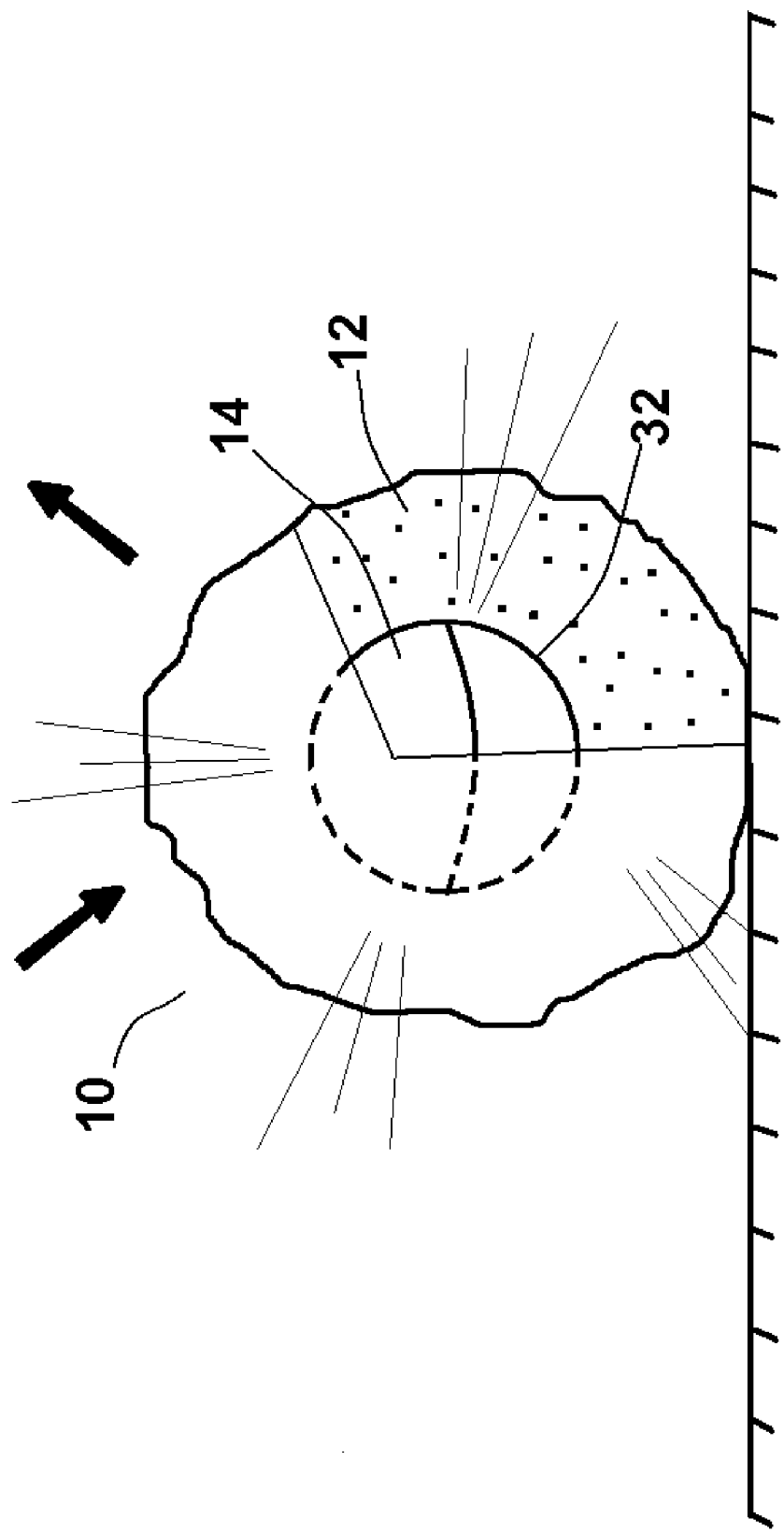
FIG. 1 is a fragmented view of an exemplary embodiment of the present invention system containing a volume of putty material and an internal illumination module.
Figure 2:
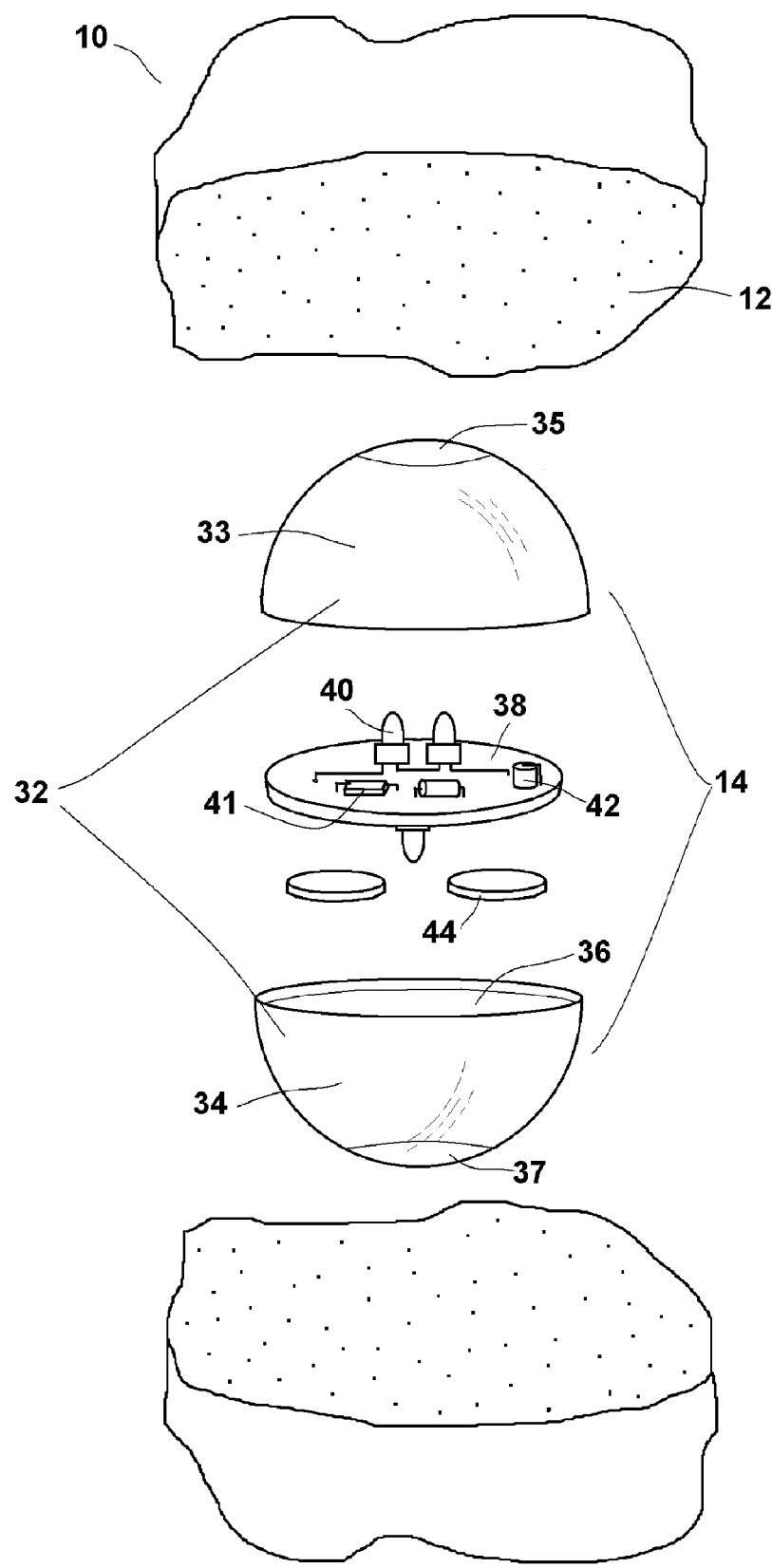
FIG. 2 is an exploded view of the exemplary embodiment of FIG. 1.

Referring to FIG. 1 in conjunction with FIG. 2, the present invention novelty system 10 is shown. The novelty system 10 is comprised of a volume of a translucent putty material 12 and an internal illumination module 14 that is used to illuminate the translucent putty material 12 from within. The translucent putty material 12 is an amorphous putty made primarily from the reaction between silicon oil and boric acid. As such, the translucent putty material 12 has tradition characteristics of such putties, in that the translucent putty material 12 both bounces and easily stretches.

Figure 3:
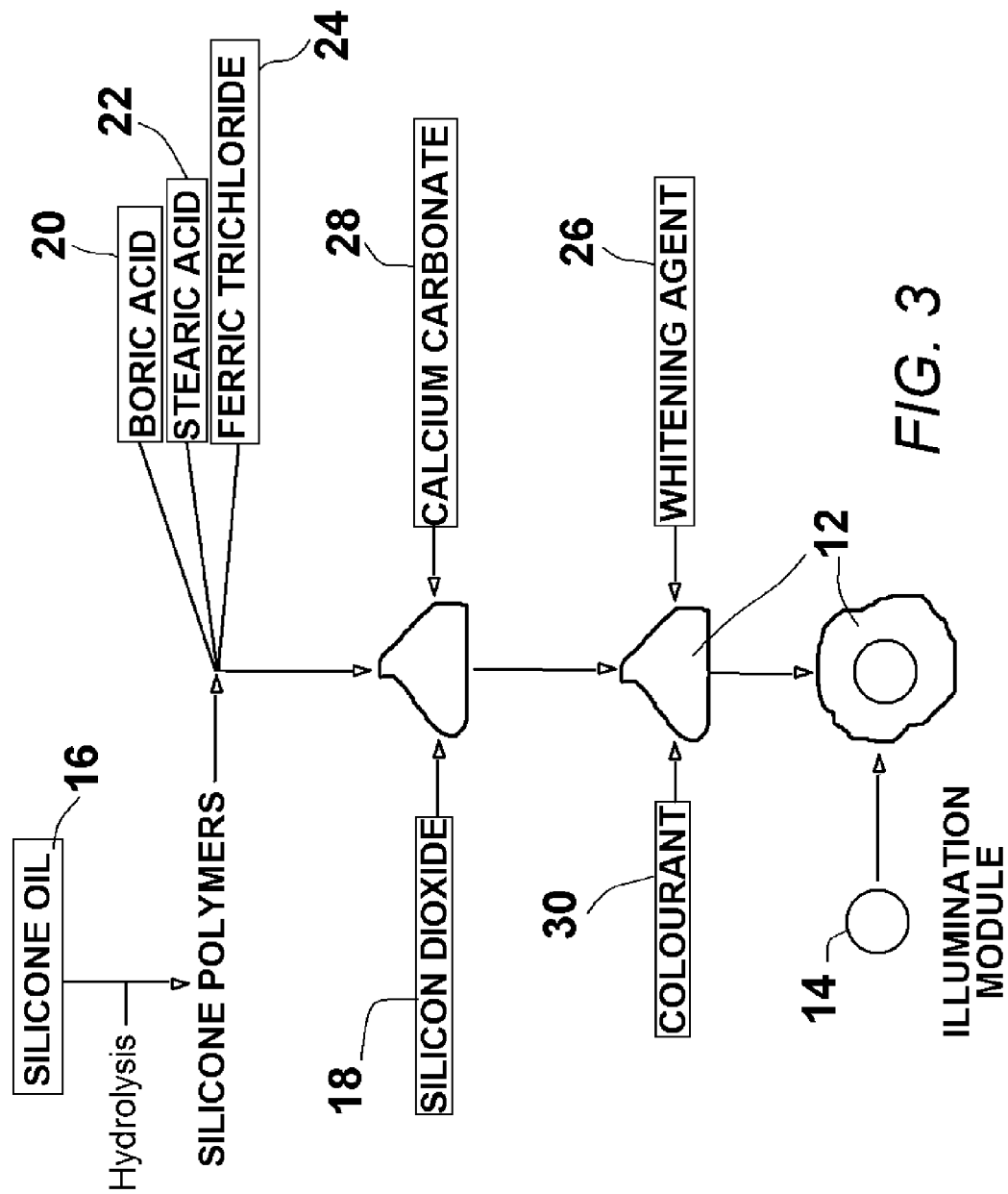
FIG. 3 is a block diagram schematic showing the composition of the translucent putty material.

Referring to FIG. 3 in conjunction with both FIG. 1 and FIG. 2, it can be seen that the primary ingredient of the translucent putty material 12 is silicon oil 16. The silicon oil 16 is preferably between 60% and 84% of the formulation by weight. Furthermore, a large percentage of silicon dioxide 18 is added. The silicon dioxide 18 is preferably between 5% and 30% of the formulation by weight.

The silicon oil 16 is reacted with boric acid 20, stearic acid 22 and ferric trichloride 24 to form a base putty material. The base putty material is then mixed with whitening agent 26 in the form of titanium dioxide. The base putty material is also mixed with up to 10% by weight of calcium carbonate 28. This produces a putty material that is translucent to light. A color tinge can be added to the putty material by adding up to 2.5% of a selected colorant 30 to the putty material. The result is a colored putty material 12 that is translucent to light. Translucent to light is defined as enabling at least 10% of the light energy from a common 3 volt LED to pass through a one centimeter layer of the putty material 12.

Referring back to FIG. 1 and FIG. 2, it can be seen that the illumination module 14 has an exterior housing 32. In the shown embodiment, the housing 32 is generally spherical in shape. However, it should be understood that other housing shapes, such as oblong housings and cylindrical housings, could also be used. It is preferred that the selected housing have no salient points that could poke through the putty material 12. The exterior housing 32 is made from transparent or highly translucent hard plastic so that light can be emitted out through the structure of the exterior housing 32. Lens sections 35, 37 of the housing 32 can also be formed into biconvex shapes to provide some power of magnification to light exiting the housing 32. The exterior housing 32 preferably has a diameter that is less than half the size of the volume of putty material 12 sold with the illumination module 14, should that volume of putty material 12 be rolled into a ball. In this manner, when the illumination module 14 is placed within the putty material 12, the thickness of the putty material 12 around the illumination module 14 will average one centimeter or less for the contemplated unit volume of the putty material 12 to be sold at retail.

The exterior housing 16 of the illumination module 14 is divided into two hemispherical sections 33, 34. The two hemispherical sections 33, 34 are joined together along a common equator and define a completely sealed interior 36.

A circuit board 38 is placed within the interior 36 of the housing 32. At least one light source 40 is mounted to the circuit board 38. The light source 40 is preferably a light emitting diode (LED). It is preferred that at least one light source 40 be mounted to both sides of the circuit board 38. In this manner, light will emanate from opposite sides of the circuit board 38. Furthermore, it is preferred that the each light source 40 be positioned below a lens section 35, 37 on the housing 32. In this manner, any beams of light can be focused using the lens sections 35, 37.

Logic circuitry 41 is mounted to the circuit board 38. The logic circuitry 41 includes an accelerometer 42. The accelerometer 42 can be any circuit board device or sub-circuit that is capable of detecting when the circuit board 38 has experienced a change in acceleration above a predetermined threshold. The accelerometer 42 is used as an activation switch. Batteries 44 are supplied within the housing 32 for powering the light source 40. The batteries 44 send power to the light source 40 through some of the logic circuitry. The logic circuitry 41 utilizes the accelerometer 42 to activate the light source 40 when the overall illumination module 14 is subjected to a predetermined acceleration. Furthermore, the logic circuitry 41 includes a timing circuit for keeping the light source 40 activated for a predetermined period of time, such as fifteen seconds. After that period of time expires, the light source 40 is automatically deactivated until the accelerometer 42 again detects a threshold change in acceleration.

The housing 32 of the illumination module 14 is sealed. As such, the circuit board 38, logic circuitry 41, batteries 44 and light sources 40 are isolated from the putty material 12. The putty material 12 is highly amorphous. As such, when the illumination module 14 is enveloped by the putty material 12, a person can easily squeeze the illumination module 16 by squeezing the putty material 12. Such squeeze forces do not activate the illumination module 14 because the illumination module only experiences small changes in acceleration as the putty material 12 is squeezed and kneaded.

However, once the illumination module 14 is enveloped in the putty material 12, the putty material 12 can be cropped or thrown against another object. The putty material 12 is highly resilient to sudden forces and will therefore bounce upon impact. The bounce causes the illumination module 14 to experience significant changes in acceleration that surpass the activation threshold. As a result, the light source 40 within the illumination module 14 activates.

In the embodiment of FIG. 1, the illumination module 16 is shown in an activated condition, wherein the light source 24 is emitting light. The light emitted by the light source 24 passes through the translucent putty material 12 and internally illuminates the putty material 12. The light also travels through the putty material 12 into any shape that the putty material 12 may been formed, thereby internally illuminating those forms.

By placing the illumination module 16 inside the putty material 12, a novelty system 10 is created that is soft at all possible points of impact. Yet, the novelty system 10 can both bounce and stretch while remaining internally illuminated.

It will be understood that the embodiment of the present invention novelty system that is shown is merely exemplary and that a person skilled in the art can make many variations to the embodiment without departing from the intended scope of the invention. All such modifications, variations and alternate embodiments are intended to be included within the scope of the present invention as defined by the claims.

What is claimed is:

1. A novelty system, comprising:
   an illumination module containing a battery and at least one LED that produces light when powered by said battery;
   a volume of putty material sufficient enough to completely envelope said illumination module, wherein said putty material is translucent so that said light from said at least one LED can be seen through said putty material when said illumination module is enveloped within said volume of putty material; and wherein said putty material is a silicone polymer putty having residual hydroxyl groups that are cross-linked using boric acid, stearic acid, and ferric trichloride.

2. The system according to claim 1, wherein said putty material contains at least five percent silicon dioxide by weight.

3. The system according to claim 1, wherein said putty material contains up to ten percent calcium carbonate by weight.

4. The system according to claim 1, wherein said putty material contains a whitening agent in the form of titanium dioxide.

5. The system according to claim 1, wherein said putty material contains a colorant.

6. The system according to claim 1, wherein said illumination module includes a transparent housing for holding said at least one LED and said battery.

7. The system according to claim 6, further including an accelerometer for activating said at least one LED, wherein said accelerometer triggers activation when a threshold change in acceleration is experienced.

8. A novelty system, comprising:
   a volume of translucent putty material, wherein said translucent putty material contains silicone oil that is reacted with boric acid, stearic acid, and ferric trichloride to form a base putty material, and silicon dioxide that is mixed within said base putty material to form said translucent putty; and
   an illumination module containing a battery and a light source powered by said battery, wherein said volume of translucent putty material is sufficient to envelop said illumination module so as to be internally illuminated by said illumination module.

9. The system according to claim 8, wherein said light source includes at least one LED.

10. The system according to claim 8, wherein said putty material contains at least five percent silicon dioxide by weight.

11. The system according to claim 8, wherein said putty material further includes up to ten percent calcium carbonate by weight.

12. The system according to claim 8, wherein said putty material further contains a whitening agent in the form of titanium dioxide.

13. The system according to claim 8, wherein said putty material further contains a colorant.

14. The system according to claim 8, wherein said illumination module includes a transparent housing for holding said light source and said battery.

15. The system according to claim 14, further including an accelerometer for activating said at least one LED, wherein said accelerometer triggers activation when a threshold change in acceleration is experienced.

16. A translucent putty composition, comprising:
   at least 60% silicone oil by weight;
   at least 5% silicon dioxide;
   at least 0.5% boric acid;
   at least 0.1% of stearic acid; a ferric trichloride; and a calcium carbonate; wherein said silicone oil is reacted with said boric acid, said stearic acid, and said ferric trichloride to produce a base putty material, and wherein said silicon dioxide is mixed with said base putty material.

17. The composition according to claim 16, further including a whitening agent.

* * * * *